(12) United States Patent
Haldeman et al.

(10) Patent No.: US 10,988,243 B2
(45) Date of Patent: Apr. 27, 2021

(54) TENSION-TORSION STRAP

(71) Applicant: Bell Textron Inc., Fort Worth, TX (US)

(72) Inventors: Andrew Paul Haldeman, Fort Worth, TX (US); Gary Miller, North Richland Hills, TX (US)

(73) Assignee: Bell Textron Inc., Fort Worth, TX (US)

( * ) Notice: Subject to any disclaimer, the term of this patent is extended or adjusted under 35 U.S.C. 154(b) by 125 days.

(21) Appl. No.: 16/354,421

(22) Filed: Mar. 15, 2019

(65) Prior Publication Data
US 2020/0290732 A1   Sep. 17, 2020

(51) Int. Cl.
| | | |
|---|---|---|
| *B64C 27/33* | (2006.01) | |
| *B64C 27/35* | (2006.01) | |
| *B64C 27/48* | (2006.01) | |
| *B32B 27/12* | (2006.01) | |
| *B29K 307/04* | (2006.01) | |
| *B29K 75/00* | (2006.01) | |

(52) U.S. Cl.
CPC ............. *B64C 27/33* (2013.01); *B64C 27/35* (2013.01); *B64C 27/48* (2013.01); *B29K 2075/00* (2013.01); *B29K 2307/04* (2013.01); *B32B 27/12* (2013.01); *B32B 2260/021* (2013.01); *B32B 2260/046* (2013.01); *B32B 2262/101* (2013.01); *B32B 2262/106* (2013.01)

(58) Field of Classification Search
CPC . B32B 5/12; B32B 2255/02; B32B 2260/046; B32B 2262/106; D10B 2101/12; D10B 2401/063; D10B 2505/02; B64C 27/35; B64C 27/473; B64C 27/48; B64C 2027/4736

See application file for complete search history.

(56) References Cited

U.S. PATENT DOCUMENTS

| | | | | | |
|---|---|---|---|---|---|
| 2,961,051 | A | * | 11/1960 | Wilford | ............... B64C 27/41 416/102 |
| 3,411,379 | A | * | 11/1968 | Deyerling | ............... B29C 70/86 74/579 R |
| 3,475,988 | A | * | 11/1969 | Ditlinger | ............... B64C 27/327 74/579 R |
| 3,765,267 | A | * | 10/1973 | Bourquardez | ..... B29D 99/0025 74/581 |
| 3,885,887 | A | * | 5/1975 | Desjardins | ............. B64C 27/33 416/141 |
| 3,918,836 | A | * | 11/1975 | Johnson | .................. F16J 15/52 416/136 |
| 4,021,141 | A | * | 5/1977 | Watson | .................. B64C 27/33 416/141 |
| 4,195,967 | A | * | 4/1980 | Weiland | ................. B64C 27/45 416/134 A |
| 4,264,277 | A | * | 4/1981 | McCafferty | ............ B64C 27/35 403/348 |
| 4,455,123 | A | * | 6/1984 | Sanders | .................. B64C 27/33 416/134 A |

(Continued)

*Primary Examiner* — Woody A Lee, Jr.
*Assistant Examiner* — Behnoush Haghighian
(74) *Attorney, Agent, or Firm* — Shackelford, Bowen, McKinley & Norton, LLP

(57) ABSTRACT

A tension-torsion strap, for example for a rotor aircraft, including a continuous length of carbon fiber tow arranged in multiple loops to form an elongated member extending between opposing ends and a flexible cover encasing the carbon fiber tow.

17 Claims, 3 Drawing Sheets

(56) References Cited

U.S. PATENT DOCUMENTS

| | | | | |
|---|---|---|---|---|
| 4,477,225 A * | 10/1984 | Burkam | | B64C 27/41 |
| | | | | 416/134 A |
| 4,496,671 A * | 1/1985 | Yoshinaga | | D01F 11/14 |
| | | | | 428/367 |
| 4,666,372 A * | 5/1987 | Avila | | B64C 27/33 |
| | | | | 416/134 A |
| 5,059,094 A | 10/1991 | Robinson et al. | | |
| 5,297,934 A * | 3/1994 | Desjardins | | B64C 27/78 |
| | | | | 416/163 |
| 5,415,525 A * | 5/1995 | Desjardins | | B64C 27/45 |
| | | | | 416/164 |
| 5,478,204 A * | 12/1995 | Desjardins | | B64C 27/45 |
| | | | | 416/168 R |
| 5,820,344 A | 10/1998 | Hamilton et al. | | |
| 7,118,340 B2 * | 10/2006 | D'Anna | | B64C 27/10 |
| | | | | 416/1 |
| 7,503,750 B1 * | 3/2009 | Violette | | B64C 11/06 |
| | | | | 416/134 A |
| 7,926,759 B2 * | 4/2011 | Muylaert | | B64C 27/82 |
| | | | | 244/17.21 |
| 8,122,586 B2 * | 2/2012 | Muylaert | | B64C 27/48 |
| | | | | 29/592 |
| 8,235,665 B2 * | 8/2012 | Muylaert | | B64C 27/33 |
| | | | | 416/135 |
| 8,689,534 B1 * | 4/2014 | Chou | | F16G 15/12 |
| | | | | 59/78 |
| 9,434,471 B2 * | 9/2016 | Arlton | | B64C 27/605 |
| 9,499,262 B2 | 11/2016 | Foskey et al. | | |
| 9,636,893 B2 * | 5/2017 | Markowski | | B32B 37/16 |
| 9,790,055 B2 * | 10/2017 | Kere | | B66B 7/08 |
| 9,937,671 B2 * | 4/2018 | Larson | | B29C 70/222 |
| 10,059,438 B2 * | 8/2018 | Rauber | | B64C 27/35 |
| 10,220,545 B2 * | 3/2019 | Lofgren | | B29C 70/34 |
| 10,265,885 B2 * | 4/2019 | Vieth | | B32B 27/34 |
| 10,279,570 B2 * | 5/2019 | Miller | | B32B 5/08 |
| 10,301,012 B2 * | 5/2019 | Darrow, Jr. | | B64C 27/32 |
| 10,576,335 B2 * | 3/2020 | Greaney | | B32B 5/022 |
| 10,597,141 B2 * | 3/2020 | Kordel | | B64C 9/00 |
| 10,604,247 B2 * | 3/2020 | Darrow, Jr. | | B64C 27/33 |
| 10,647,407 B2 * | 5/2020 | Kordel | | B64C 9/02 |
| 10,696,386 B2 * | 6/2020 | Miner | | B64C 27/48 |
| 10,697,148 B2 * | 6/2020 | Hallale | | E02F 3/627 |
| 10,759,516 B2 * | 9/2020 | Kordel | | B64C 9/16 |
| 2010/0034654 A1 * | 2/2010 | Muylaert | | B64C 27/33 |
| | | | | 416/134 A |
| 2010/0119862 A1 * | 5/2010 | Wilson | | B32B 15/14 |
| | | | | 428/586 |
| 2011/0247958 A1 * | 10/2011 | Lucas | | B32B 5/02 |
| | | | | 206/524.6 |
| 2013/0164129 A1 * | 6/2013 | Rauber | | B64C 11/04 |
| | | | | 416/1 |
| 2014/0250856 A1 * | 9/2014 | Chou | | B21L 11/00 |
| | | | | 59/90 |
| 2014/0255201 A1 * | 9/2014 | Sutton | | B64C 27/463 |
| | | | | 416/241 R |
| 2015/0375478 A1 * | 12/2015 | Gruhn | | C09J 177/00 |
| | | | | 442/286 |
| 2015/0376946 A1 * | 12/2015 | Kurzer | | B29C 65/70 |
| | | | | 182/194 |
| 2017/0106970 A1 * | 4/2017 | Stawski | | B32B 5/26 |
| 2018/0148166 A1 * | 5/2018 | Darrow, Jr. | | B64C 27/48 |
| 2018/0305006 A1 * | 10/2018 | Lehto | | B64C 27/327 |
| 2019/0202543 A1 * | 7/2019 | Gatto | | F03D 1/0675 |
| 2019/0300147 A1 * | 10/2019 | Kordel | | B64C 9/16 |

\* cited by examiner

TENSION-TORSION STRAP

TECHNICAL FIELD

This application relates generally to the field of rotor systems, and more particularly, to tension-torsion straps for aircraft rotor systems.

BACKGROUND

This section provides background information to facilitate a better understanding of the various aspects of the disclosure. It should be understood that the statements in this section of this document are to be read in this light, and not as admissions of prior art.

Rotor systems are well known in the art for effectively utilizing a plurality of rotor blades to create horizontal and vertical flight. During operation, the rotor blades exert forces on the hub assembly, for example, lead/lag, feathering, centrifugal, coning, and flapping forces. In some embodiments, one or more of these forces could cause the rotor system to fail. Thus, rotor systems typically include different means for compensating these and other forces exerted on the hub assembly. For example, in some embodiments the rotor system could include elastomeric elements, spring-rate dampers, bearings, and/or other suitable means for reducing, and in some cases eliminating, the effects of these forces on the hub assembly.

SUMMARY

An exemplary tension-torsion strap includes carbon fiber tow encased in a flexible cover. Another exemplary tension-torsion strap includes a single continuous length of carbon fiber tow arranged in multiple loops to form an elongated member extending between opposing ends, a flexible cover encasing the carbon fiber tow, the flexible cover constructed of urethane, and each of the opposing ends having a fastener.

An exemplary rotor system for a rotor aircraft includes a tension-torsion strap coupled to a hub assembly and coupled to a rotor blade, the tension-torsion strap having a continuous length of carbon fiber tow arranged in multiple loops to form an elongated member extending between opposing ends and a flexible cover encasing the carbon fiber tow.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
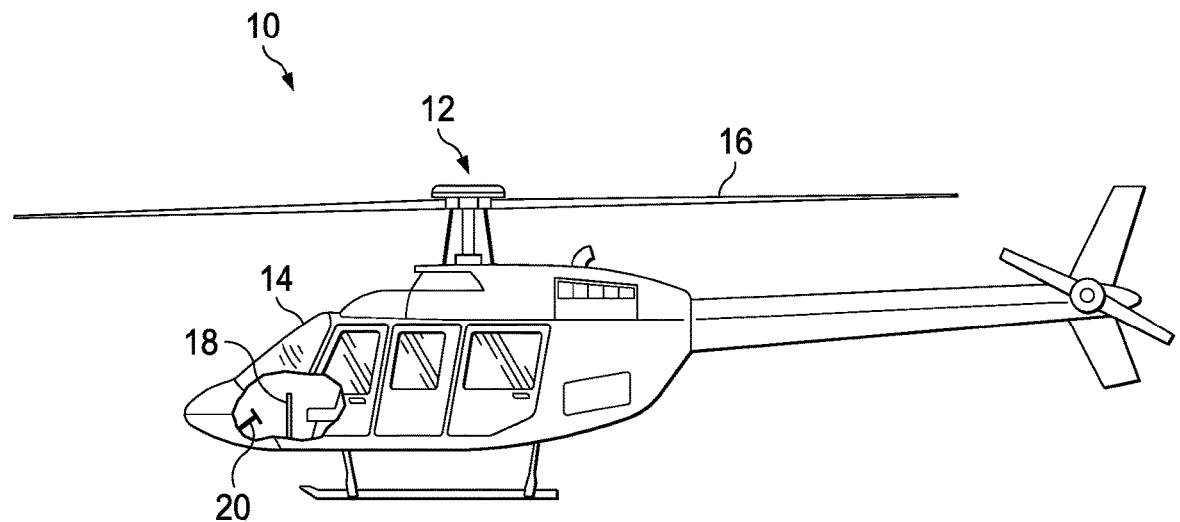
FIG. 1 illustrates an exemplary rotor aircraft in which the tension-torsion strap may be incorporated.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 2:
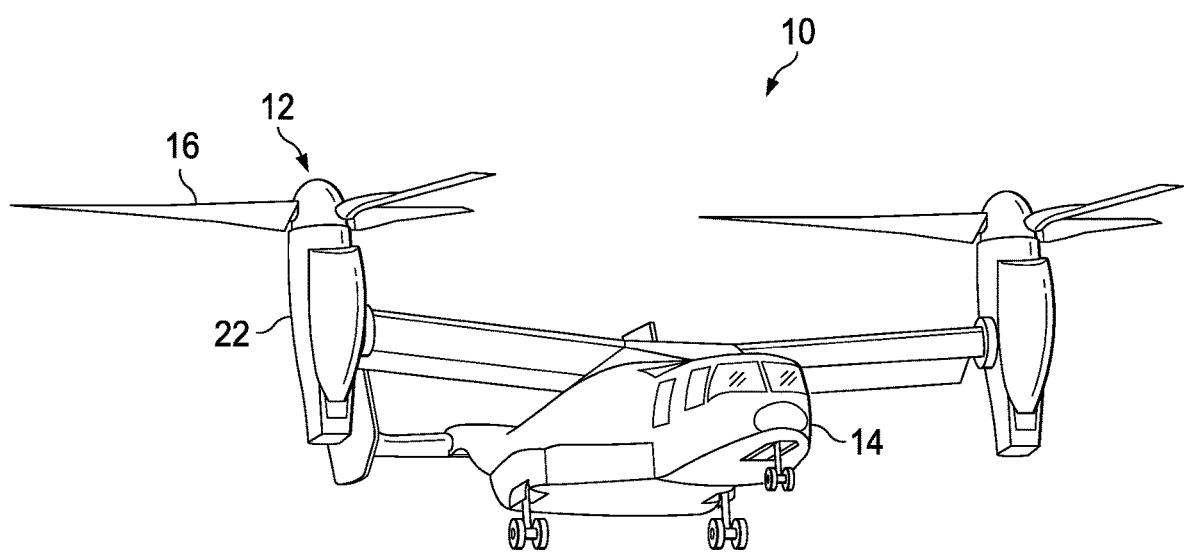
FIG. 2 illustrates another exemplary rotor aircraft in which the tension-torsion strap may be incorporated.

FIGS. 1 and 2 illustrate two different rotor aircraft, generally denoted by the numeral 10, utilizing a tension-torsion strap according to aspects of this disclosure. Aircraft 10 is illustrated in FIG. 1 as a helicopter and in FIG. 2 as a tiltrotor aircraft.

Helicopter 10 has a rotor system 12 carried by a fuselage 14. One or more rotor blades 16 operably associated with rotor system 12 provide flight for helicopter 10 and are controlled with a plurality of controllers within fuselage 14. For example, during flight a pilot can manipulate the cyclic controller 18 for changing the pitch angle of rotor blades 16 and/or manipulate pedals 20, thus providing vertical, horizontal, and yaw flight movement.

Tiltrotor aircraft 10 includes two or more rotor systems 12 having rotor blades 16 carried by rotatable nacelles 22. The rotatable nacelles provide means for allowing aircraft 10 to take off and land like a conventional helicopter and for horizontal flight like a conventional fixed wing aircraft. It should be understood that, like helicopter 10, tiltrotor aircraft 10 is provided with controls, e.g., cyclic controllers and pedals, carried within fuselage 14 for controlling movement of the aircraft.

Figure 3:
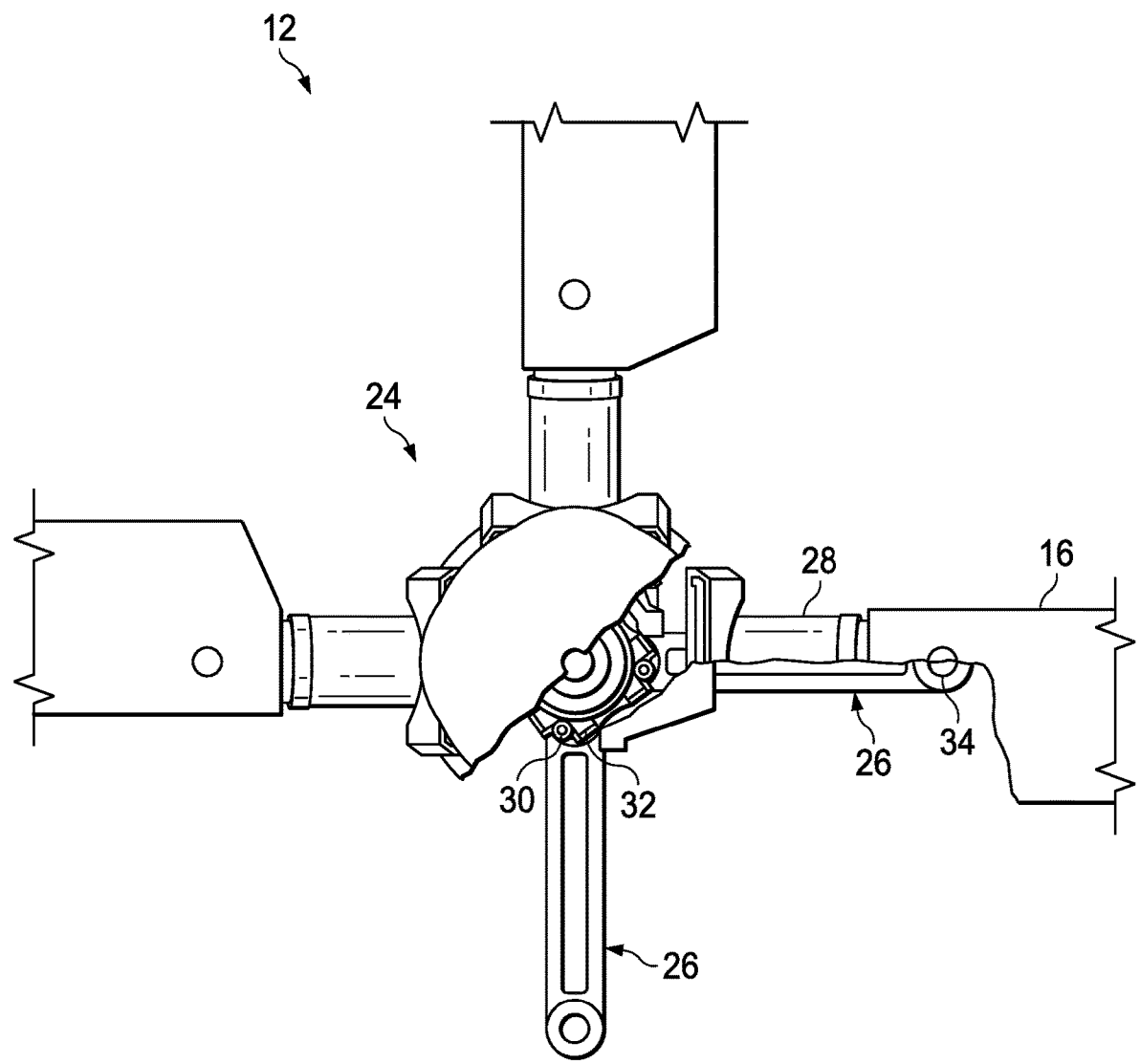
FIG. 3 illustrates an example of rotor system incorporating a tension-torsion strap according to one or more aspects of the disclosure.

Referring specifically to FIG. 3 in the drawings, rotor system 12 includes a plurality of rotor blades 16 operably associated with a hub assembly 24. During operation, an aircraft engine drives and rotates hub assembly 24, which in turn creates flight via rotor blades 16. In the exemplary embodiment, rotor system 12 is shown having four rotor blades 16; however, it will be appreciated that the features of rotor system 12 discussed herein could easily be adapted for use with more or less rotor blades. For ease of description, one of four blades 16 and devices operably associated therewith are discussed in detail. However, it should be understood that the remaining blades and associated components are substantially similar in form and function to blade 16 and include the features discussed herein.

Hub assembly 24 is provided with a tension-torsion strap 26 for controlling both centrifugal and feathering forces exerted against hub assembly 24 during flight. It will be appreciated that tension-torsion strap 26 may also control lead/lag and flapping movement of the rotor blades during flight. During operation, tension-torsion strap 26 allows for torsion (twisting) movement caused by blade feathering, and restricts tension (longitudinal) movement caused by blade centrifugal forces.

In the illustrated example, tension-torsion strap 26 extends through hollow yoke arm 28 and provides effective means for attaching rotor blades 16 to hub assembly 24. In this example, tension-torsion strap 26 is connected at one end to hub assembly 24 via a fastener 30, for example at a constant velocity (CV) joint 32, and is connected at the opposite end by a fastener 34 to blade 16.

Figure 4:
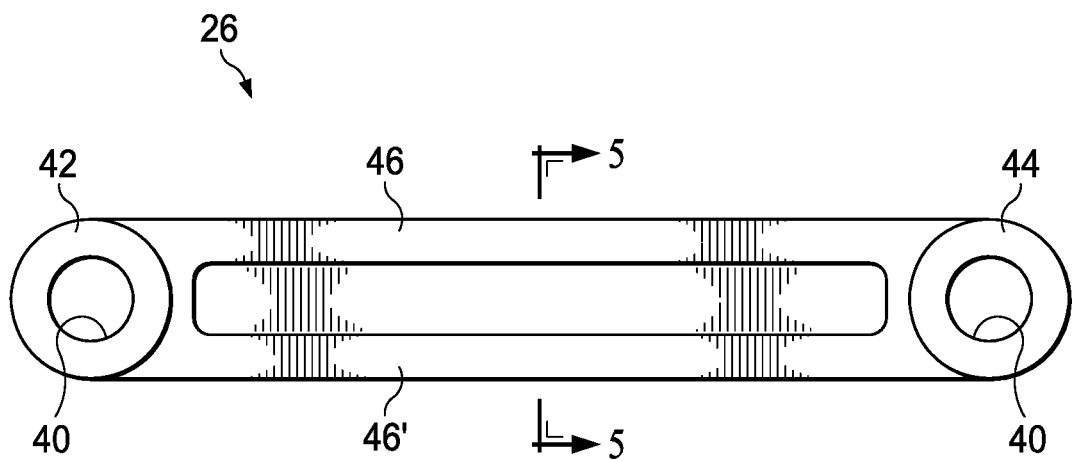
FIG. 4 illustrates an exemplary tension-torsion strap according to one or more aspects of the disclosure.
Figure 5:
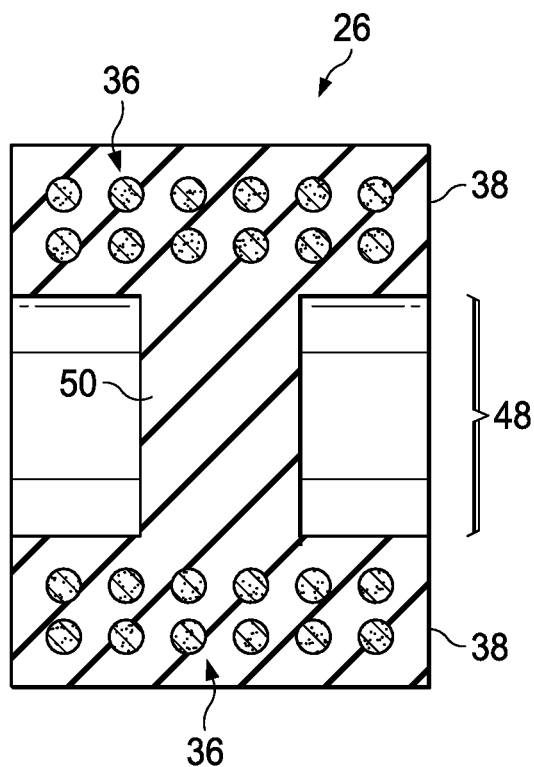
FIG. 5 illustrates an exemplary section view of a tension-torsion strap along the line 5-5 of FIG. 4.

FIG. 4 illustrates an exemplary tension-torsion strap 26 and FIG. 5 is an exemplary sectional view along the line 5-5 of FIG. 4. Tension-torsion strap 26 is constructed of carbon fiber tow 36 encased in a flexible cover 38. Tension-torsion strap 26 is an elongated member having a fastener 40 located at each of its opposing ends 42, 44. In this example, fasteners 40 are apertures configured to connect with respective fasteners on an aircraft's rotor hub and blade.

In a particular embodiment, tension-torsion strap 26 is constructed of a continuous length of carbon fiber tow 36 that is wound in multiple loops around the opposing fasteners 40. In the FIGS. 4 and 5 examples, tension-torsion strap 26 has two parallel extending legs 46, 46' that are formed by the loops of carbon fiber tow 36 with the opposite ends of the carbon fiber tow loops forming the opposing ends 42, 44. In this example, leg 46 and leg 46' are separately encased in flexible cover 38 and are laterally separated from one another by a gap 48. In this particular example, a web 50 extends across gap 48 and interconnects legs 46, 46' along their length between opposing fasteners 40. Web 50 may be formed of the same material as flexible cover 38 and be a part of flexible cover 38.

Carbon fiber tow 36 is shown in FIG. 5 having a round cross-section. Carbon fiber tow 36 may be a flat tow having a substantially planar cross-section. In at least one embodiment, carbon fiber tow 36 is untwisted and the loops extend substantially parallel to each other. In a non-limiting example, carbon fiber tow 36 is a 24K carbon multifilament continuous tow having a tensile strength for example of about 700 ksi or greater.

Prior art tension-torsion straps are constructed of metallic wire windings. A primary failure mode of prior art tension-torsion straps is degradation of the urethane casing, which allows moisture ingress resulting in corrosion of the metallic wire windings. These prior art tension-torsion straps have a limited life that is commonly measured both in calendar life, e.g., 4-years, and by flight hours, e.g., 2500 hours. For example, some prior art tension-torsion straps are constructed of MP35N wire, which is corrosion resistant and considered high-strength, e.g. 320-345 ksi tensile strength.

Carbon fiber tow 36 is not susceptible to many of the forms of corrosion that affect metal. Additionally, carbon fiber tow has a greater tensile strength then metal wire and has a lower density resulting in a lower weight carbon fiber tension-torsion strap compared to metal wire.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A tension-torsion strap couplable between a rotor blade and a hub assembly of a rotor aircraft, the tension-torsion strap comprising:

A single carbon fiber tow that forms an elongated member;

a fastener at each of two opposing ends of the elongated member to couple the tension-torsion strap between the rotor blade and the hub assembly;

a flexible cover encasing the elongated member; and
wherein the single carbon fiber tow consists of a single continuous length of carbon fiber.

2. The tension-torsion strap of claim 1, wherein the flexible cover is constructed of urethane.

3. The tension-torsion strap of claim 1, wherein the continuous length of carbon fiber tow is arranged in multiple loops to form the elongated member.

4. The tension-torsion strap of claim 3, wherein the flexible cover is constructed of urethane.

5. The tension-torsion strap of claim 3, wherein the carbon fiber tow consists of a single continuous length of carbon fiber tow.

6. The tension-torsion strap of claim 1, wherein each of the fasteners is an aperture.

7. The tension-torsion strap of claim 3, wherein the multiple loops are arranged parallel to one another.

8. The tension-torsion strap of claim 3, wherein the multiple loops form two parallel extending legs that are laterally separated by a gap, each of the legs are separately encased in the flexible cover.

9. The tension-torsion strap of claim 8, further comprising a web extending across the gap and interconnecting the two parallel extending legs.

10. A tension-torsion strap for a rotor aircraft, the tension-torsion strap comprising:
   a single continuous length of carbon fiber tow arranged in multiple loops to form an elongated member extending between opposing ends;
   a flexible cover encasing the carbon fiber tow, the flexible cover constructed of urethane;
   wherein each of the opposing ends comprises a fastener; and
   wherein the fastener is an aperture.

11. The tension-torsion strap of claim 10, wherein the multiple loops form two parallel extending legs that are laterally separated by a gap, each of the legs are separately encased in the flexible cover.

12. The tension-torsion strap of claim 11, further comprising a web extending across the gap and interconnecting the two parallel extending legs.

13. A rotor system for a rotor aircraft, comprising:
   a rotor blade;
   a hub assembly; and
   a tension-torsion strap coupled to the hub assembly and coupled to the rotor blade,
   wherein the tension-torsion strap comprises:
      a continuous length of carbon fiber tow arranged in multiple loops to form an elongated member extending between opposing ends; and
      a flexible cover encasing the carbon fiber tow.

14. The rotor system of claim 13, wherein the multiple loops are arranged parallel to one another.

15. The rotor system of claim 13, wherein the carbon fiber tow consists of a single continuous length of carbon fiber tow.

16. The rotor system of claim 13, wherein the carbon fiber tow consists of a single continuous length of carbon fiber tow; and
   the multiple loops are arranged parallel to one another.

17. The rotor system of claim 16, wherein the multiple loops form two parallel extending legs that are laterally separated by a gap, each of the legs are separately encased in the flexible cover.

* * * * *